Nov. 24, 1953 E. KOLLAND 2,660,066
RECIPROCATING CARRIAGE DRIVE
Filed May 12, 1951 3 Sheets-Sheet 1
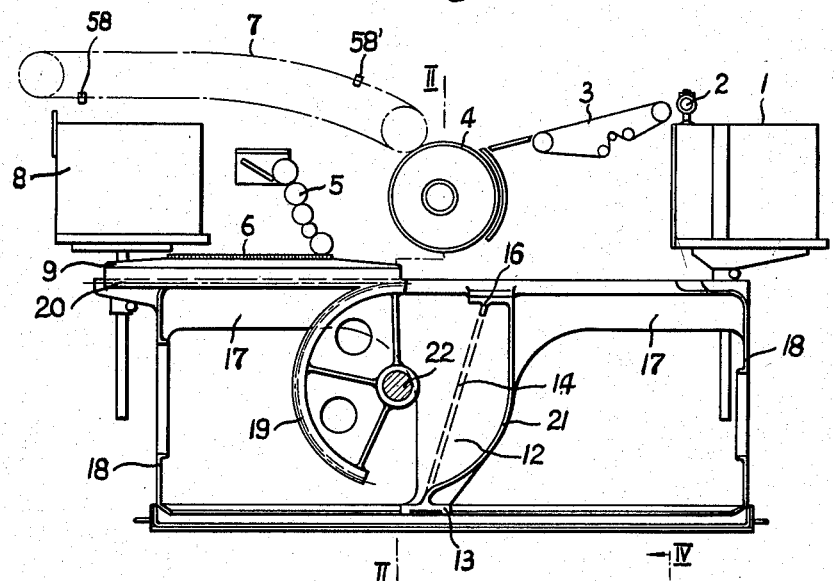
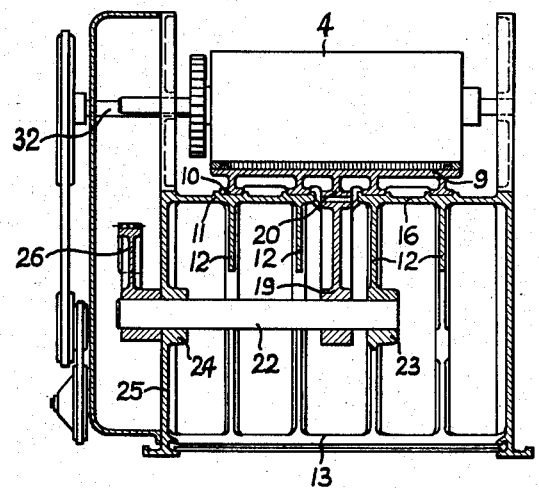
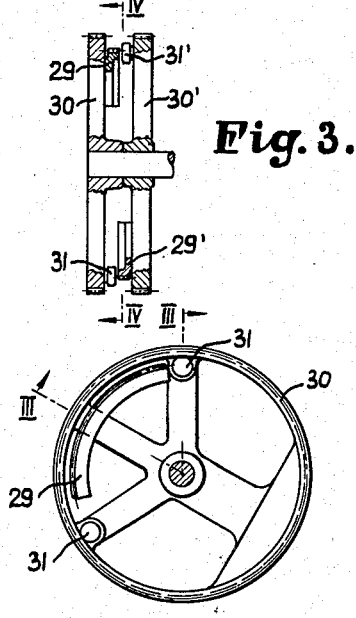
INVENTOR
EMIL KOLLAND
BY Marechal Biebel French & Bugg
ATTORNEYS Nov. 24, 1953 — E. KOLLAND — 2,660,066
RECIPROCATING CARRIAGE DRIVE
Filed May 12, 1951 — 3 Sheets-Sheet 2

INVENTOR
EMIL KOLLAND
BY Marechal Biebel French & Bugg
ATTORNEYS

Nov. 24, 1953     E. KOLLAND     2,660,066
RECIPROCATING CARRIAGE DRIVE

Filed May 12, 1951     3 Sheets-Sheet 3

INVENTOR
EMIL KOLLAND

BY Marechal & Biebel
ATTORNEYS

Patented Nov. 24, 1953

2,660,066

UNITED STATES PATENT OFFICE 2,660,066

RECIPROCATING CARRIAGE DRIVE

Emil Kolland, Augsburg, Germany, assignor to Maschinenfabrik Augsburg-Nurnberg A. G., Augsburg, Germany, a corporation of Germany Application May 12, 1951, Serial No. 225,965

Claims priority, application Germany May 17, 1950

2 Claims. (Cl. 74—27)

1

This invention relates to a drive for the reciprocating type bed of a two-revolution printing press, of the type having a toothed segment bearing at each end of its toothing an extension with cycloid-shaped recess and being alternately driven by one of two oppositely moved toothed segments each having at its end a roller for alternate engagement in the cycloid-shaped recesses.

In the hitherto known form of this drive two oppositely rotating toothed wheels carry the two rollers on their sides facing each other and the toothed segments on their sides facing away from each other. This requires a large distance between the two toothed segments for driving the shafts.

It is an object of the present invention to provide a simplified construction and a reduced overall width.

With this object and further objects in view, according to the present invention the toothed wheels carrying the two oppositely moved toothed segments carry the rollers and the toothed segments on the same sides, facing each other, which engage with a single toothed segment arranged in the plane disposed between the two toothed wheels, said latter toothed segment having approximately twice the normal width and bearing the extensions with the cycloid recesses, said extensions also having approximately twice the normal width.

Other and further objects, features and advantages of the invention will be pointed out hereinafter and appear in the appended claims forming part of the application.

In the accompanying drawings a now preferred embodiment of the invention is shown by way of illustration and not by a way of limitation.

Fig. 1 is a side view of a machine having the invention applied thereto,

Fig. 2 is a cross section on line A—B of Fig. 1,

Figure 5:
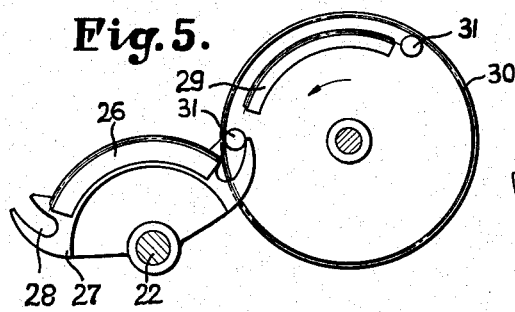
Figure 7:
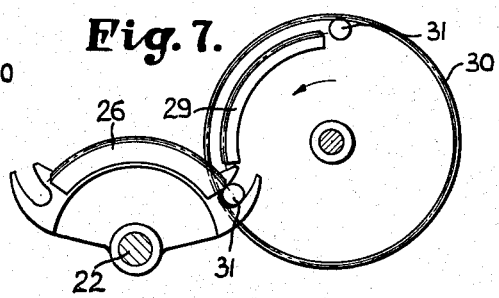
Figure 6:
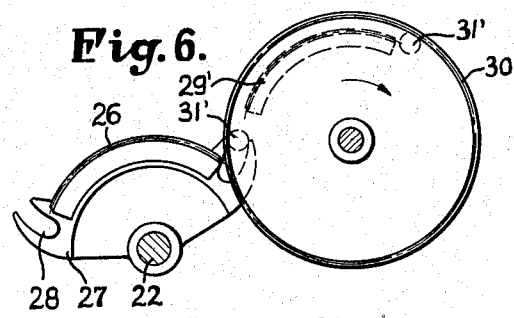
Figure 8:
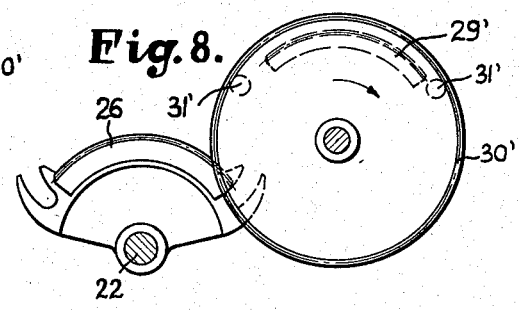

Fig. 3 is a section through the two main driving gears on the line III—III of Fig. 4, Fig. 4 is a side view of one of the main driving gears along the line IV—IV of Fig. 3, Fig. 5 is a position diagram of one counterclockwise rotating main driving gear at the beginning of a cycle with the other main driving gear removed for clarity, Fig. 6 is a position diagram of the clockwise rotating main driving gear in the same position as Fig. 5, Fig. 7 is a position diagram of the counterclockwise rotating main driving gear at a further advanced position in the cycle, Fig. 8 is a position diagram of the clockwise

Figure 9:
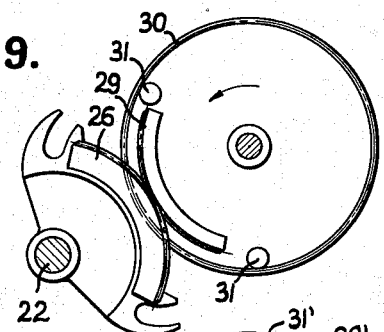
Figure 11:
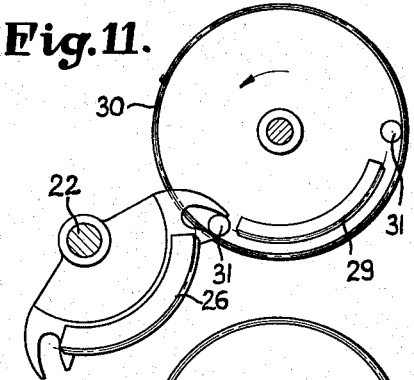
Figure 10:
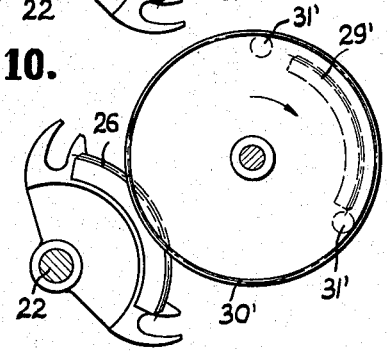
Figure 12:
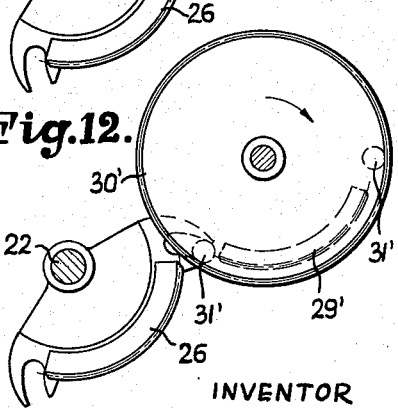
Figure 13:
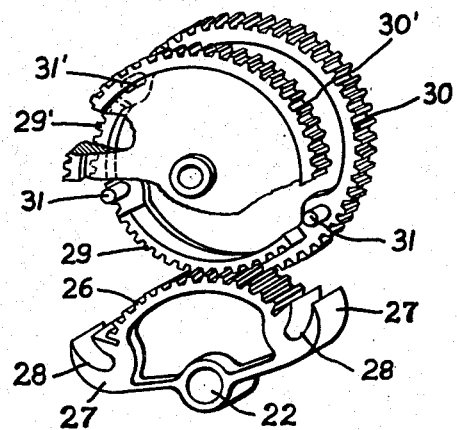

2 main driving gear in the same position as Fig. 7,

Fig. 9 is a position diagram of the rotating counterclockwise rotating driving gear at a still further advanced position in the cycle, Fig. 10 is a position diagram of the clockwise rotating driving gear in the same position as Fig. 9, Fig. 11 is a position diagram of the counterclockwise position of the rotating driving gear at the end of the cycle, Fig. 12 is a position diagram of the clockwise rotating driving gear in the same position as Fig. 11, and Fig. 13 is a perspective fragmentary view of the gear arrangement.

Similar reference numerals denote similar parts in the different views.

Referring now to the drawing in greater detail, it will be seen that the sheets are fed by the feeding apparatus 1, with the aid of the known sheet feeder 2 via the feed table 3 to the impression cylinder 4 and taken along by the same, the sheet being printed by the matter 6 inked by the inking device 5, whereupon the printed sheets are passed through the chain delivery 7 with the grippers 58, 58' to the delivery pile board 8. The matter 6 is enclosed in a type bed 9 supported by four guides 10 in corresponding tracks 11 of the machine frame. Each track 11 is supported through vertical supports 12 on the bottom boom 13 of the main transverse girder of the machine frame formed in connection with the slanting tie wall 14 and the top boom 16. The vertical supports 12 terminate under each track 11 in ribs 17 which are connected with the front walls 18. As indicated in Fig. 1, the bottom boom 13 has a slightly U-shaped form. The top boom 16 is laterally displaced in relation to the impression line so that the toothed segment 19 reciprocating the toothed rack 20 arranged in the center plane of the type bed 9 is permitted to move past the same in spite of its straight direction. The tie wall 14 is bulged at 21 in the compass of the toothed segment 19 which is mounted on a shaft 22 mounted for oscillation at 23 and 24 and bearing outside of the side wall 25 of the machine frame a toothed segment 26 which as shown in Fig. 13, has at each end an extension 27 with a cycloid-shaped recess 28. The toothed segment 26 is alternately engaged by each of the two toothed segments 29, 29' each fastened on one of the oppositely rotating toothed wheels 30 or 30', respectively. On the end of each toothed segment 29, 29' the respective toothed wheel bears a roller 31, or 31', for alternate engagement in the cycloid-shaped recesses 28, whereby the motion of the toothed segment 26 is retarded or accelerated, respectively, on engagement of one of the rollers and disengagement of the other roller. The opposite drive of the toothed wheels 30 and 30' is achieved by per se known and not shown means for the driving shaft 32, with the aid of a reversing wheel.

It will be noted that in Figs. 5-12 the mechanical motion is diagrammed for various positions in the cycle. Since, however, there is but one gear segment 26 which engages alternately both the driving segments 29 and 29' which preferably lie between the two oppositely rotating gears 30 and 30', one of these gears 30 or 30' has been omitted for clarity in each of the Figs. 5-12. Thus, Fig. 5 shows the roller 31 on gear 30 just entering one of the cycloidal recesses 28 on segment 26 while Fig. 6 diagrams the respective positions at the same moment of time with roller 31' on the oppositely rotating gear 30' just leaving the same recess 28 on the single segment 26. Since the gears 30 and 30' are oppositely rotating, the segment 26 stands still in the position shown in Figs. 5-6 with both the rollers 31 and 31' engaging the same recess 28. As the gear 30 turns further in a counterclockwise direction and the gear 30' in a clockwise direction (for example in Figs. 7-8) roller 31' completely leaves recess 28 and roller 31 imparts to the segment 26 a rapid acceleration. Thereafter segment 29 on gear 30 meshes with the teeth on segment 26 (e. g. Figs. 9-10) imparting a constant velocity to segment 26. At the end of the cycle (Figs. 11-12) gear 30' has rotated in a clockwise direction sufficiently for roller 31' to enter the other recess 28 on segment 26 to exert a braking action in the clockwise rotation of segment 26. As noted, the segment 26 is arranged in a plane intermediate the two gears 30 and 30' and is wide enough for the simultaneous accommodation of both rollers 30 and 30' in the same recess 28.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a printing press having a reciprocating type bed, driving means for imparting said reciprocating motion comprising in combination two oppositely rotating main gears, means for mounting said gears adjacent each other on a common shaft, a driving gear segment on the inner face of each said main gear, a single driven segment adjacent said main gears for meshing engagement alternately with each said driving segments on said gears, projections at each end of said driven segment defining a cycloidal recess at each end thereof, rollers on said gears adjacent said driving segments for successive engagement with said cycloidal recesses, the thickness of said driven segment and said projections thereon effecting simultaneous engagement in one of said recesses with one of said rollers on each of said gears.

2. In a printing press having a reciprocating type bed, driving means for imparting said reciprocating motion comprising in combination two adjacent oppositely rotating driving gear segments, a driven gear segment for meshing engagement alternately with each said driving gear segments during a portion only of the rotation of said segments, the thickness of said driven segment being substantially twice that of said driving segments, means for mounting said driven segment substantially in the plane between said driving segments, projections at each end of said driven segment defining cycloidal recesses therein, a roller adjacent each end of said driving segments and rotating therewith for engagement in said cycloidal recesses, the thickness of said projections being sufficient to engage simultaneously one of said rollers adjacent each of said driving segments.

EMIL KOLLAND.

References Cited in the file of this patent

UNITED STATES PATENTS

| Number | Name | Date |
|---|---|---|
| 2,356,156 | Golber | Aug. 22, 1944 |
| 2,430,644 | Moliter | Nov. 11, 1947 |